March 21, 1944.  R. H. PHELPS  2,344,896
AUTOMOTIVE SUSPENSION
Filed May 18, 1940  2 Sheets-Sheet 1
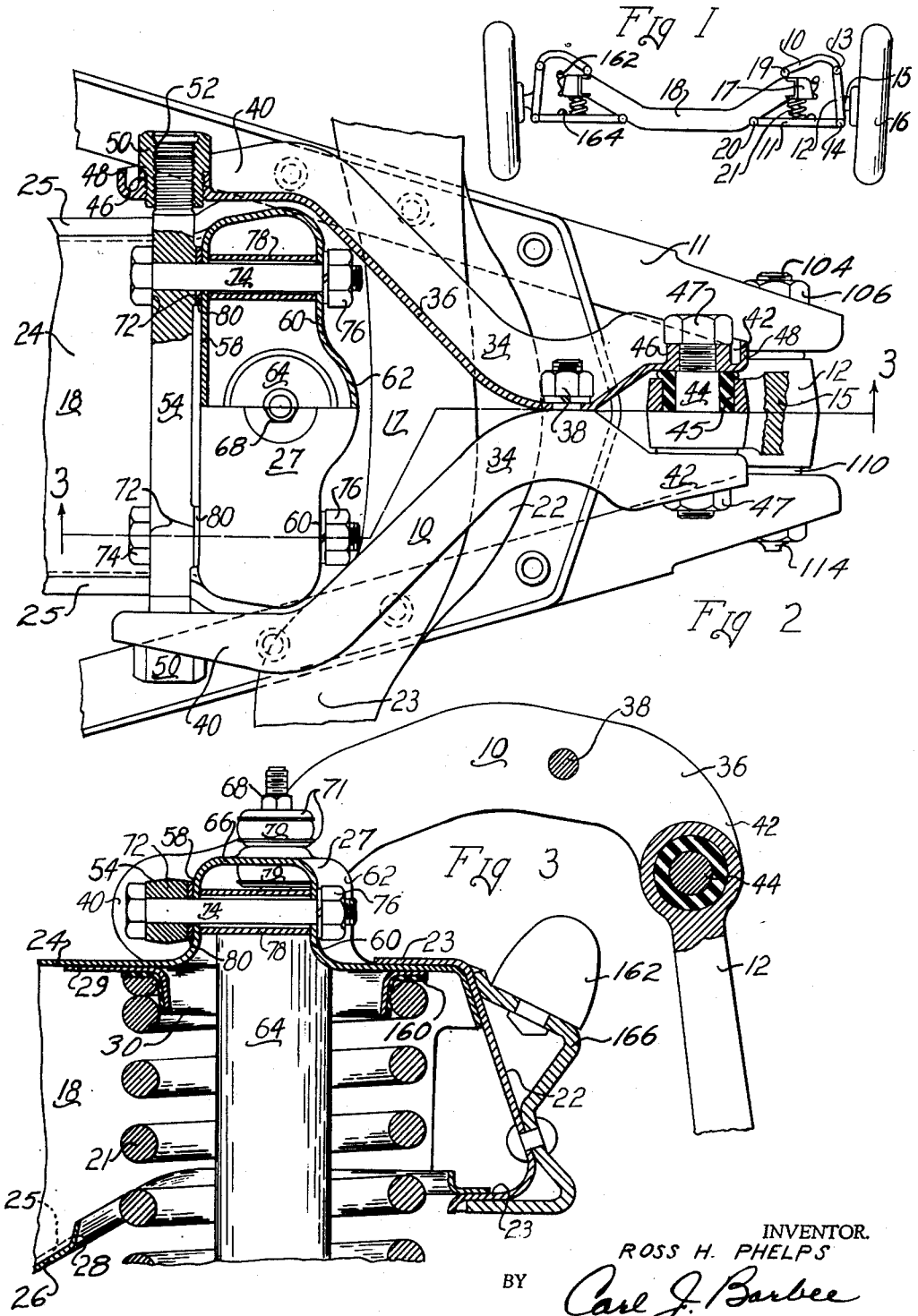
INVENTOR.
ROSS H. PHELPS
BY Carl J. Barbee
ATTORNEY.

March 21, 1944.     R. H. PHELPS     2,344,896
AUTOMOTIVE SUSPENSION
Filed May 18, 1940     2 Sheets-Sheet 2
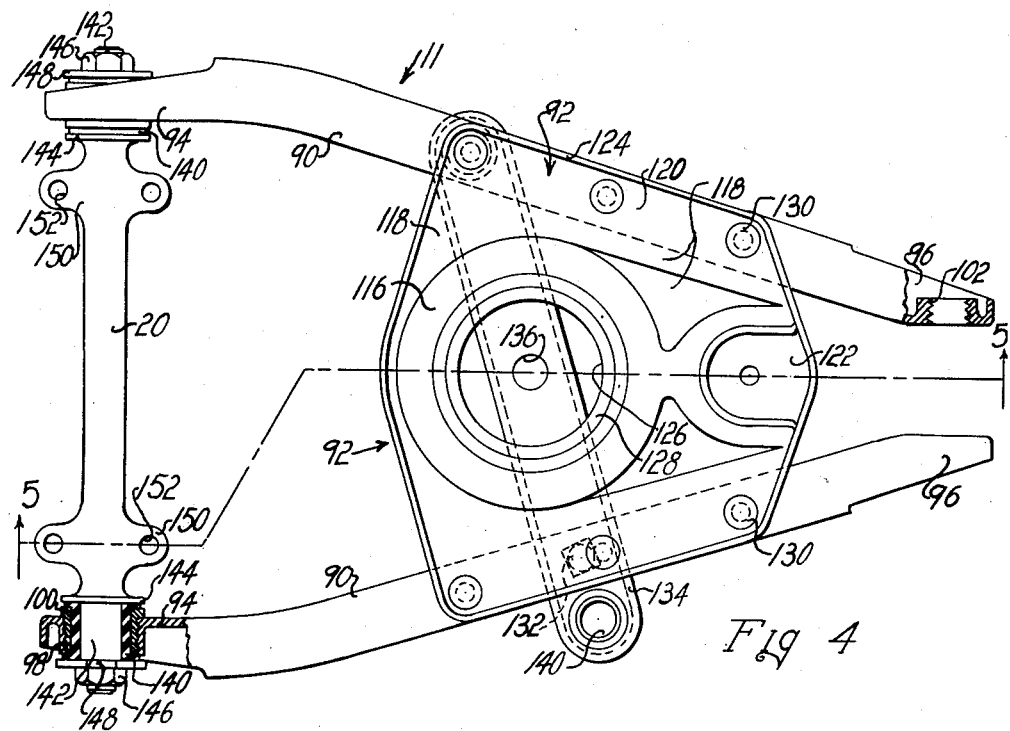
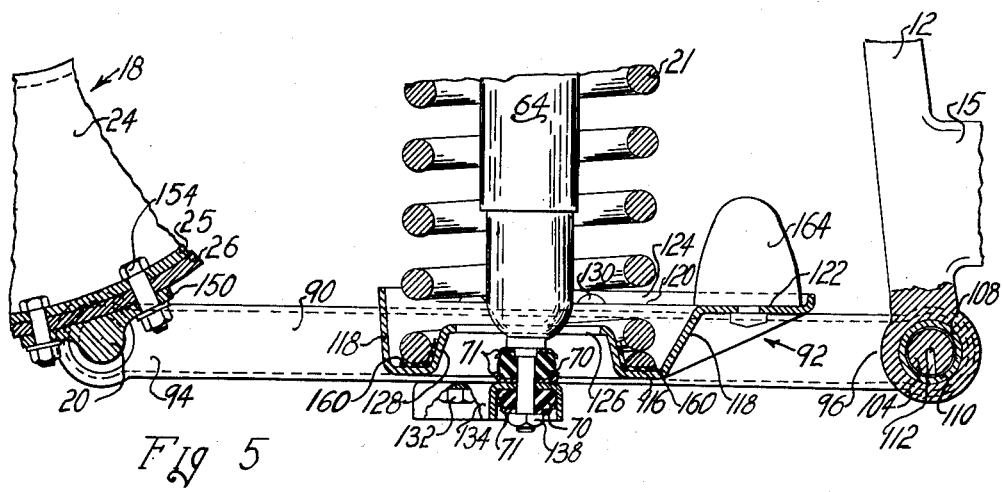
INVENTOR.
ROSS H. PHELPS
BY Carl J. Barbee
ATTORNEY.

Patented Mar. 21, 1944

2,344,896

UNITED STATES PATENT OFFICE 2,344,896

AUTOMOTIVE SUSPENSION

Ross H. Phelps, Kenosha, Wis., assignor to Nash-Kelvinator Corporation, Kenosha, Wis., a corporation of Maryland Application May 18, 1940, Serial No. 335,988

11 Claims. (Cl. 267—20)

This invention relates to automotive wheel suspensions and has particular reference to means for mounting a parallel arm suspension on the frame of an automobile.

It is an object of this invention to provide a parallel arm suspension assembly which will be cheaper than those known heretofore.

It is another object of this invention to provide a parallel arm suspension which may be more easily installed than those known heretofore.

It is another object of this invention to provide a parallel arm suspension which may be easily and positively adjusted for determining the caster and camber of the wheel.

It is another object of this invention to provide means for adjusting the caster and camber of the wheel in a parallel arm suspension, which means will not become displaced or out of alignment without obviously indicating the maladjustment.

It is another object of this invention to provide novel means on an automobile frame to which the upper control arm of a parallel arm suspension may be conveniently attached.

It is another object of this invention to provide a parallel arm suspension using a strut type shock absorber.

It is another object of this invention to provide a parallel arm suspension in which the forces in the spring and shock absorber act along the same line.

It is another object of this invention to provide means for insulating the frame of an automobile from vibrations in the wheels.

Other objects and advantages of this invention will be apparent from a consideration of the following description and attached drawings of which there are two sheets and in which—

Figure 1 represents a front elevation of an automobile frame and front wheels with the parallel arm linkage for mounting the wheels on the frame;

Figure 2 is a plan view partially in section of the upper control arm illustrated in Figure 1;

Figure 3 represents a vertical section taken along the plane indicated by the broken line 3—3 of Figure 2 and looking in the direction of the arrows;

Figure 4 represents a plan view, partially broken away, of my lower control arm; and, Figure 5 represents a sectional view taken along a plane indicated by the broken line 5—5 in Figure 4 and looking in the direction of the arrows.

I have illustrated in Figure 1 a parallel arm suspension consisting generally of an upper control arm 10 and a lower control arm 11 connected at their outer ends to a steering knuckle support arm 12 by pivots 13 and 14 respectively. The support arm 12 carries a steering knuckle 15 on which the wheel 16 is mounted in the usual manner. The suspension is mounted on the frame of the automobile which consists of side rail members 17 and downwardly bowed cross member 18, the upper control arm 10 being pivoted to the raised end of the cross member at 19 and the lower control arm being pivoted to the bent down portion of the cross member at 20. Shocks caused by the wheels passing over uneven ground are cushioned by the coil springs 21 positioned between the lower control arm 11 and the raised end portions of the cross member 18. Shock absorbers are provided in a manner which will be more particularly described later.

The side members 17 consist of channel members having an outwardly curved portion 22 (see Figures 2 and 3). The flanges 23 of the side members 17 are faced toward the center of the car and the cross member 18 is secured between the flanges 23 at the outwardly curved portion 22 as by welding. The cross member 18 consists of a downwardly opening channel-shaped member 24, having outturned flanges 25 at its lower edges, closed by a plate 26 secured to the outturned flanges 25 as by riveting or welding. The channel member 24 has a dome 27 pressed upwardly from each end of its upper wall or web. The plate 26 is apertured as at 28 under each dome 27. The aperture 28 makes room for the spring 21 which seats against a plate 29 secured as by welding to the under side of the channel member 24. The spring 21 is retained in position by the annular flange 30 pressed downwardly from the plate 29 and defining an aperture under the dome 27. For the purposes of description, my invention may be conveniently broken up into a consideration of the upper control arm, lower control arm and the spring and shock absorber connections.

As illustrated in Figure 2, my upper control arm 10 consists of two channel-shaped members 34, the webs 36 of which are clamped together by the bolt 38. Toward the inner end of the arm 10 from the bolt 38 the channel members 34 are bent apart at an angle and then bent into spaced parallel leg portions 40 which are connected to the cross member 18 in a manner which will be more particularly described later. Toward the outer end of the arm 10 from the bolt 38 the channel members are bent apart but to a less extent than the inner end. The outer ends of the channel members are then bent into outer parallel leg portions 42 which are connected by a shouldered pin 44 and nuts 47 which form the pivot 13 for supporting the upper end of the steering knuckle support arm 12. The rubber grommet 45 between the pin 44 and the steering knuckle support arm 12 will be more particularly described later.

More specifically, the channel members 34 are formed with their flanges facing away from each other and with the webs 36 secured together back to back by the bolt 38. The webs 36 are apertured and extruded at each end of the channel members as indicated at 46 and the flanges are carried completely around the ends as indicated at 48. The extruded portion 46 at the inner ends 40 of the channel members 34 are shaped with a shallow internal thread into which are screwed bushings 50 which are internally threaded as at 52. The bushings 50 rotatably receive the threaded ends of a pivot bar 54 which forms the pivot 19.

The dome 27 may be conveniently stamped from the upper wall or web of the channel member 24 and is shaped to have a vertical wall 58 extending generally parallel to the longitudinal axis of the car along its inner side. The outer side of the dome 27 is shaped to have end portions 60 parallel to the inner wall 58 and may be provided with a bulged out section 62 to make room for a strut type shock absorber 64 fastened to the upper surface 66 of the dome 27 by means of a nut 68 screwed on the bayonet end of the shock absorber and cushioned by the rubber biscuits 70 retained between metal washers 71.

The pivot bar 54 is provided with two flattened portions 72 which are apertured to receive bolts 74 which extend through the vertical wall 58 of the dome 27 and the parallel end portions 60 of the dome 27. The pivot bar 54 is drawn against the inner wall 58 by means of the nuts 76 screwed on the ends of the bolts 74 and the walls 58 and 60 of the dome 27 are prevented from collapsing by the sleeves 78 positioned around the bolts 74.

Between the flat portions 72 of the pivot bar 54 and the vertical wall 58 of the dome 27 I have provided washers or shims 80 which space the pivot bar slightly from the vertical wall 58. I contemplate that the thickness of the shims 80 may be changed to change the position of the control arm 10 relative to the dome 27 and cross member 18. Thus if thicker shims 80 are used, the control arm 10 as a whole will be moved toward the center of the car, drawing the pin 44 toward the center of the car which serves to tilt the support arm 12 at a greater angle and decrease the camber adjustment of the wheel 16. Conversely a thinner shim 80 will increase the camber of the wheel 16. If one of the shims 80 is thickened without thickening the other shim, the arm 10 will be moved in a horizontal plane about the unchanged shim as a center, throwing the outer end 42 of the control arm toward the front or rear of the position shown in Figure 2. This will tilt the control arm 14 forwardly or toward the rear of the position illustrated in Figure 2 and cause the caster adjustment of the wheel 16 to be changed.

This method of caster and camber adjustment makes the setting positive and cannot be changed except by loosening the nuts 76, in which case the control arm would rattle, indicating that something was wrong, or by bending the frame or one of the control arms out of its original shaping. There is no adjustable connection which might become slightly shifted without indicating the change to the operator.

This type of caster and camber adjustment lends itself very well to production line assembly of cars in that one frame may be accurately measured and the proper size shim determined for obtaining the proper caster and camber adjustment of the wheel. After that the wheels on following cars may be automatically mounted to the proper caster and camber without resorting to time and labor consuming measurements and adjustment by simply using the size shims determined from the first test frame. Only periodic checks will be necessary to be sure that the measurements and alignment of the frame remain the same. Attention is also called to the fact that the bolts 74 and nuts 76 are horizontal and more easily reached and tightened from underneath a fender than are bolts passed vertically through the channel member 24.

The lower control arm 11 with its spring and shock absorber connections and connections to the frame and steering knuckle support arm is most clearly illustrated in Figures 4 and 5. It will be noted that the cross member 18, spring 21, shock absorber 64 and steering knuckle support arm 12 are omitted in Figure 4 for the purpose of clarity of the drawings.

Lower control arm 11 consists of a pair of channel-shaped legs 90, supported at their inner ends by the pivot bar 20 and joined at their midsection by the spring seat generally indicated at 92. Legs 90 have parallel inner end portions 94 from which they converge toward the outer end of the arm 11. The outer ends 96 of the legs 90 are bent into spaced parallel relationship.

The web portion of inner ends 94 of the legs 90 are extruded and provided with shallow threads as indicated at 98 within which are pressed bushings 100. The outer ends 96 of the legs 90 are extruded and internally threaded (see Figure 4) as at 102 and support an externally threaded pin 104 (see Figure 5) which forms the piovt 14 shown in Figure 1. The pin 104 is maintained in place by nuts 106 (see Figure 2) threaded on each end thereof at the front and back of arm 11. The steering knuckle support arm 12 is apertured at 108 at its lower end and provided with a bushing 110 screwed into shallow threads formed in the aperture 108. Bushing 110 is internally threaded to rotatably receive the threaded pin 104. It will be noted that the pin 104 is drilled at 112 (see Figure 5) and provided with a lubrication fitting 114 (see Figure 2) by means of which lubricant may be forced into the threads between the pin 104 and bushing 110.

The plate 92 may be conveniently made as a metal stamping and consists of a circular seat portion 116 around the edges of which are formed upturned walls 118 which are flattened along the sides to overlie the converging side legs 90 and form the apertured bumper seat 122. A vertical strengthening flange 124 extends completely around the plate. The circular seat portion is pressed upwardly and apertured at 126, thus forming an annular flange 128 which centers the spring 21 on the seat 116. The plate 92 is held in place by means of rivets 130 which pass through the side portions 120 and the upper flanges of the converging legs 90.

Secured to the lower flanges of the legs 90 by removable bolts 132 is a bar 134 which is channel-shaped in cross section and passes under the center of the aperture 126 in the plate 92. Bar 134 is apertured at 136 near its center to receive the bayonet end of the strut type shock absorber 64. The shock absorber 64 is secured in place by the nut 138 and the connection is cushioned and insulated by the rubber biscuits 70 retained between metal washers 71 in the same manner in which the top of the shock absorber is secured to the cross member 18. The bar 134 is extended beyond the front of the arm 11 and is apertured as at 140 (see Figure 4) so that a stabilizer bar may be connected between the two lower control arms 11 on the automobile in the usual manner. Removable bolts 132 are used in place of rivets so that bar 134 may be removed and the shock absorber 64 removed for service without removing the entire assembly.

The bushings 100 at the inner ends 94 of the legs 90 receive the flanged rubber grommets 140 which in turn support the end portions 142 of the pivot bar 20. Pivot bar 20 is provided with the shoulder forming flanges 144 adjacent each of the end portions 142, and the end portions 142 are threaded to receive the nuts 146. Washers 148 are drawn down by the nuts 146 against the flanged end of grommets 140 to retain the legs 90 on the pivot bar 20. Pivot bar 20 is provided with ears 150 which may be forged with oh otherwise suitably secured to the bar 20 and which are apertured at 152. Pivot bar 20 is secured to the cross member 18 by bolts 154 (see Figure 5) which pass through the apertures 152 in the ears 150 and through the flanges 25 of the channel-shaped member 24 of the cross member 18 and the plate 26.

Particular attention is called to the type of pivots at 20 and 13 between the inner ends 94 of the lower control arm 11 and the pivot bar 20 and the outer ends 42 of the upper control arm 10 and the pin 44 respectively. In each case the flanged rubber grommets (140 and 45) are subjected to endwise pressure (between bolts 146, washers 148 and flanges 144 in the first case and between the end portions 42 of channel member 10 drawn together by the nuts 47 on pin 44 in the second case). This endwise pressure expands the rubber grommets into tight, non-rotating relationship with the end portions 142 of the bar 20 and bushing 100 and pin 44 and steering knuckle support arm 12. There is no sliding motion between the parts at these pivots and movement is taken up in flexing of the rubber grommets which act to absorb some of the energy moving the support and control arms and to absorb and prevent the transmission of noises from the wheel to the frame. This type of rubber grommet and connection is known to the trade as a "Harris" type mounting or pivot. It is to be noted that the two channel members 34 of the upper control arm 10 may be separated to allow the insertion of grommet 45 by removal of the bolt 38.

To cooperate with the insulating properties of the grommets 45 and 100 and the rubber biscuits 70 at each end of the shock absorber, I have provided annular flanged gaskets 160 of rubber or other sound impervious and silencing material at each end of spring 21 between the spring and upper seat 28 and lower seat 116.

In order to limit the downward or rebound movement of the control arms I have provided a dome-shaped rubber bumper 162 secured to a bracket 166 (see Figure 3) welded to the curved-out portion 22 of the side frame member 17 so that it will engage the upper control arm 10 toward the lower limit of movement of the arm. Bumper 162 is so positioned as to engage upper control arm upon the flanges 34 at their point of abutment where they mutually reinforce one another and where the bolt 38 reinforces both. Upward movement of the control arms is limited by the rubber bumper 164 (see Figure 5) mounted on the apertured bumper seat portion 122 of the stamping 92. Bumper 164 will engage the underside of bracket 166 toward the top limit or bump position of the wheels.

It will thus be apparent that I have provided a parallel arm suspension that is made largely of stampings which are cheaper and lighter than forgings. The suspension also uses an inexpensive strut type shock absorber which acts along the same line as the coil spring and does not impart any load to the upper control arm. The suspension is easily and positively adjusted as to caster and camber and completely insulates the wheel from metallic contact with the frame, thus providing quiet operation. Special attention is called to the fact that the rubber grommets 45 and 140 are positioned at diametrically opposed positions with respect to the four pivots 13, 14, 19 and 20 so that none of the members are rubber mounted at each end. This reduces the tendency of the supporting members to twist out of their true position in the plane of movement of the suspension due to deforming of the rubber grommets.

While I have described my invention in some detail, I intend this description to be an example only and not limiting on my invention to which I make the following claims:

1. In an automobile, a frame, a cross member having a dome pressed upwardly therefrom, parallel walls formed on said dome, a pivot bar, a control arm supported on said pivot bar, two bolts passed through said parallel walls to secure said pivot bar to said frame, means between said walls and adjacent to said bolts arranged to prevent said walls from collapsing, and shims positioned around said bolts and between said pivot bar and one of said walls.

2. In an automobile, a cross member having a dome pressed from the upper wall thereof, parallel walls formed on said dome, a pivot bar secured adjacent one of said parallel walls by bolts passed through said pivot bar and said parallel walls, sleeves positioned around said bolts and between said parallel walls, an upper control arm pivoted on the ends of said pivot bar, and washers positioned around said bolts between said pivot bar and said parallel wall.

3. In an automobile, a cross member having a dome pressed from the upper wall thereof, parallel vertical walls formed on said dome, said walls being approximately parallel to a vertical plane passed through the longitudinal axis of the automobile, and a pivot bar for a wheel suspension system secured to one of said walls.

4. In an automobile, a frame having a dome pressed from a wall thereof, parallel walls formed on said dome, a pivot bar secured adjacent one of said parallel walls by bolts passed through said pivot bar and said parallel walls, sleeves positioned around said bolts and between said parallel walls, a control arm pivoted on the ends of said pivot bar, and washers positioned around said bolts between said pivot bar and said parallel wall.

5. An automotive wheel suspension comprising a frame with a cross member having a dome pressed upwardly from the end thereof, said dome having generally vertical spaced parallel walls, an upper control arm being pivotally supported by said spaced parallel walls, a lower control arm pivoted on said frame, a support arm having one end pivoted to said upper control arm and one end pivoted to said lower control arm, four pivot pins for said pivoted connections, rubber bushings on two diametrically disposed pivot pins for insulating said support arm and one of said control arms from said frame, and a strut type shock absorber extending between the top of said dome and said lower control arm.

6. An automotive wheel suspension comprising a frame, an upper control arm pivoted on said frame, a lower control arm pivoted on said frame, a support arm having one end pivoted to said upper control arm and one end pivoted to said lower control arm, four pivot pins for said pivoted connections, rubber bushings on two diametrically disposed pivot pins for insulating said support arm and one of said control arms from said frame, a coil spring positioned between said frame and said lower control arm, and a strut type shock absorber connected between said frame and said lower control arm and located within said coil spring, said spring and shock absorber being rubber mounted.

7. A parallel arm suspension comprising a frame, a lower control arm having two channel-shaped legs, a spring seat secured to the top of said legs and having a depressed center portion defining an aperture, an upper portion extending between the tops of said legs, a coil spring positioned between said frame and said depressed portion and around said aperture, a rubber bumper secured on top of said upper portion of said spring seat, a bar removably secured on the underside of said legs and extending under the center of said aperture, and a strut type shock absorber extending through said aperture and connected to said bar, said bar extending beyond one of said legs to form a connection with a stabilizer bar.

8. A parallel arm suspension comprising a lower control arm having two channel-shaped legs, a spring seat secured to the top flanges of said channel-shaped legs, a flange formed from said spring seat defining an aperture, a coil spring abutting against said spring seat and around said flange, a bar bolted to the lower flanges of said legs and extending under said aperture, and a strut type shock absorber extending through said aperture and supported upon said bar.

9. A parallel arm suspension comprising a lower control arm having two channel-shaped legs, a spring seat secured to the top flanges of said channel-shaped legs, a flange formed from said spring seat defining an aperture, a coil spring abutting against said spring seat and around said flange, a bar bolted to the lower flanges of said legs and extending under said aperture, and a strut type shock absorber extending through said aperture and supported upon said bar, said bar extending beyond one of said legs to form a connection for a stabilizer.

10. A parallel arm suspension comprising a frame, a lower control arm pivoted to said frame and having two spaced legs channel-shaped in cross section, a spring seat riveted to the top flanges of said legs, an annular flange pressed from said spring seat defining an aperture, a coil spring positioned between said frame and said seat and around said annular flange, a strut type shock absorber positioned within said spring and secured at its upper end to said frame, and means for supporting the lower end of said shock absorber including a bar bolted to the lower flanges of said legs.

11. An automotive wheel suspension comprising a frame member having a dome pressed from a wall thereof, parallel walls formed on said dome, a pivot bar secured adjacent to one of said parallel walls by bolts passed through said pivot bar and said parallel walls, means extending between said walls and adjacent to said bolts arranged to prevent said walls from collapsing, and a control arm pivoted on the ends of said pivot bar.

ROSS H. PHELPS.